(12) United States Patent
Pratap

(10) Patent No.: US 12,259,754 B1
(45) Date of Patent: Mar. 25, 2025

(54) EVAPORATIVE HUMIDIFIER TO MAINTAIN HUMIDITY OF VR HEADSET MICROCLIMATE

(71) Applicant: Suraj Pratap, Las Vegas, NV (US)

(72) Inventor: Suraj Pratap, Las Vegas, NV (US)

( * ) Notice: Subject to any disclaimer, the term of this patent is extended or adjusted under 35 U.S.C. 154(b) by 0 days.

(21) Appl. No.: 18/764,384

(22) Filed: Jul. 5, 2024

(51) Int. Cl.
*F24F 6/00* (2006.01)
*B01F 23/21* (2022.01)
*G06F 1/16* (2006.01)

(52) U.S. Cl.
CPC .............. *G06F 1/163* (2013.01); *B01F 23/21* (2022.01); *B01F 23/211* (2022.01); *F24F 6/00* (2013.01); *F24F 2006/008* (2013.01)

(58) Field of Classification Search
CPC ............ B01F 23/21; B01F 23/211; F24F 6/00
See application file for complete search history.

(56) References Cited

U.S. PATENT DOCUMENTS 11,918,289 B2 * 3/2024 Azar .................... A61B 3/0008

FOREIGN PATENT DOCUMENTS

CN 101749795 A * 6/2010

* cited by examiner

*Primary Examiner* — Robert A Hopkins
(74) *Attorney, Agent, or Firm* — Plager Schack LLP; Mark H. Plager, Esq.; Naomi Mann, Esq.

(57) ABSTRACT

A virtual reality system that increases humidity within a virtual reality headset via at least one humidification element incorporated into the headset. The humidification element may comprise a water retaining reservoir which includes at least one evaporative surface that allows for diffusion of the water from within the reservoir.

10 Claims, 4 Drawing Sheets

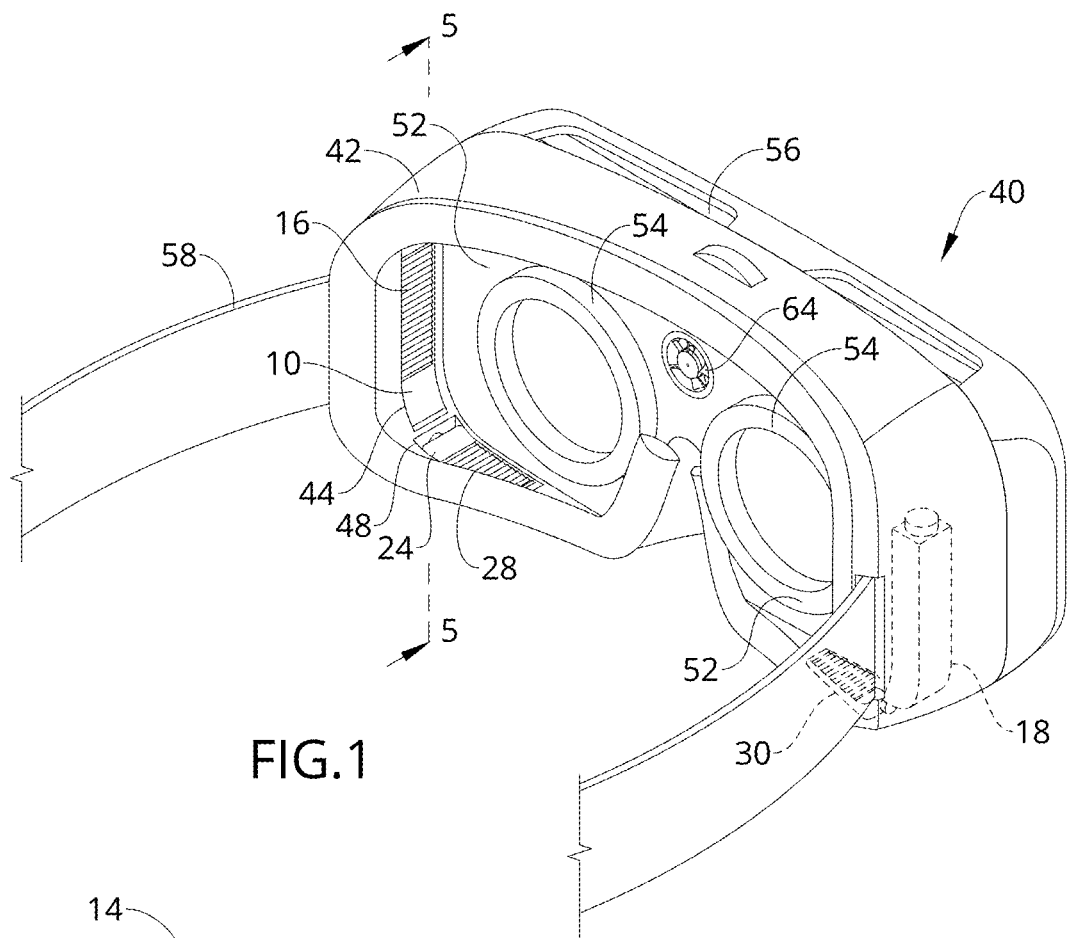
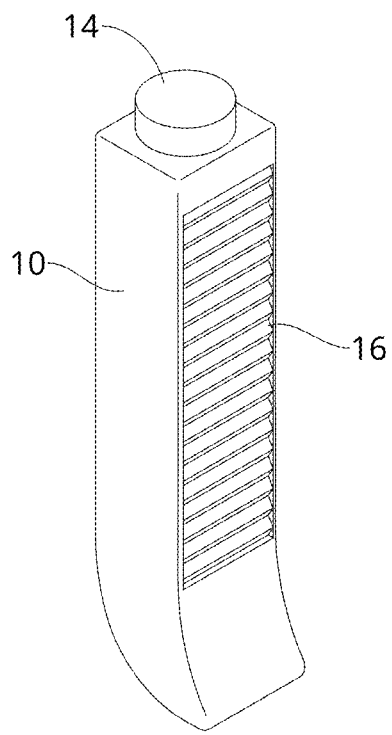

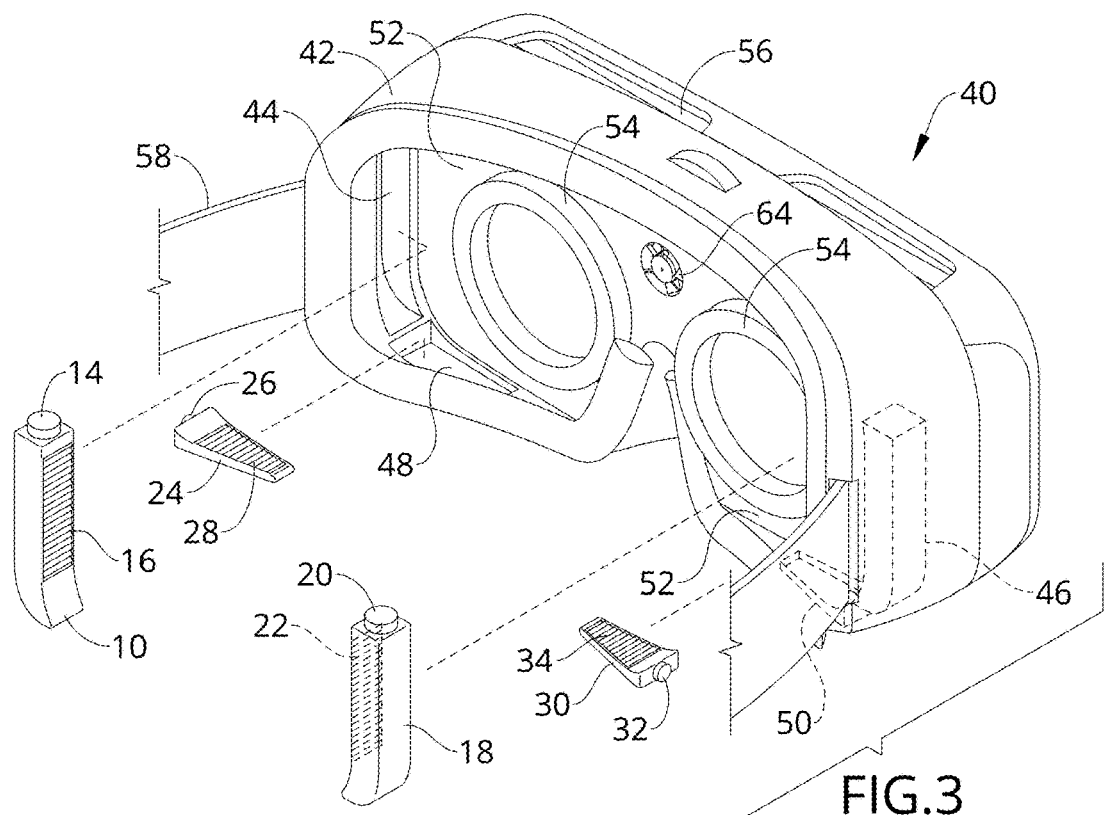
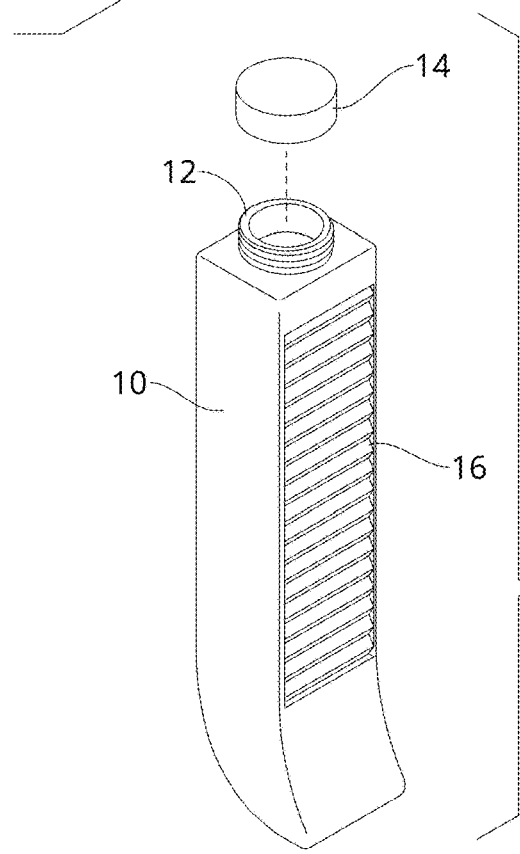

EVAPORATIVE HUMIDIFIER TO MAINTAIN HUMIDITY OF VR HEADSET MICROCLIMATE

BACKGROUND

The present disclosure relates generally to virtual reality (VR) and/or computer display system including virtual reality headsets.

Prolonged use of virtual reality headsets may lead to eye problems including dryness due to reduced blinking, amongst others. As such, an improved system that addresses such issues is desirable.

SUMMARY

According to various embodiments, disclosed is a virtual reality headset humidification system which optimizes the humidity of the microclimate around the eye area of an individual using a virtual reality headset via at least one humidification element incorporated into the headset. In some embodiments, the humidification element comprises a water retaining reservoir which includes at least one evaporative surface that allows for diffusion of the water from within the reservoir. In certain embodiments, the evaporative surface comprises a semi-permeable pleated membrane which can be biological or synthetic in composition. Examples of biological membranes include but are not limited to cellulose and examples of synthetic membrane include but are not limited to polyamide. In some embodiments, the reservoir has an ergonomic shape configured to insert into a slot within a housing of the virtual reality headset. In further embodiments, the slot is provided on an interior side of the housing and is configured to introduce humidity into the interior cavity of the headset. In further embodiments the water reservoir may be outside and separate from the VR headset and connected to the evaporative elements in the headset by tubes.

BRIEF DESCRIPTION OF THE FIGURES

The detailed description of some embodiments of the invention will be made below with reference to the accompanying figures, wherein the figures disclose one or more embodiments of the present invention.

FIG. 1 is a perspective view of a virtual reality (VR) headset including a humidifier assembly according to certain embodiments.

FIG. 2 is a perspective view of an exemplary humidification element of the humidifier assembly.

FIG. 3 is an exploded view of the VR headset system depicted in FIG. 1.

FIG. 4 is an exploded view of the humidifier container.

DETAILED DESCRIPTION OF CERTAIN EMBODIMENTS

Factors such as increased affordability and diversity of compatible programs and games are expected to significantly increase future use of VR headsets. Along with the increased time spent using VR headsets, comes the challenge of eye fatigue and long-term vision problems, including a potential risk for progressive refractory errors and xerophthalmia particularly in young children during the age when their globe is still immature. Such issues may be caused and/or exacerbated by eye dryness due to reduced blinking when using immersive VR headsets.

Figure 5:
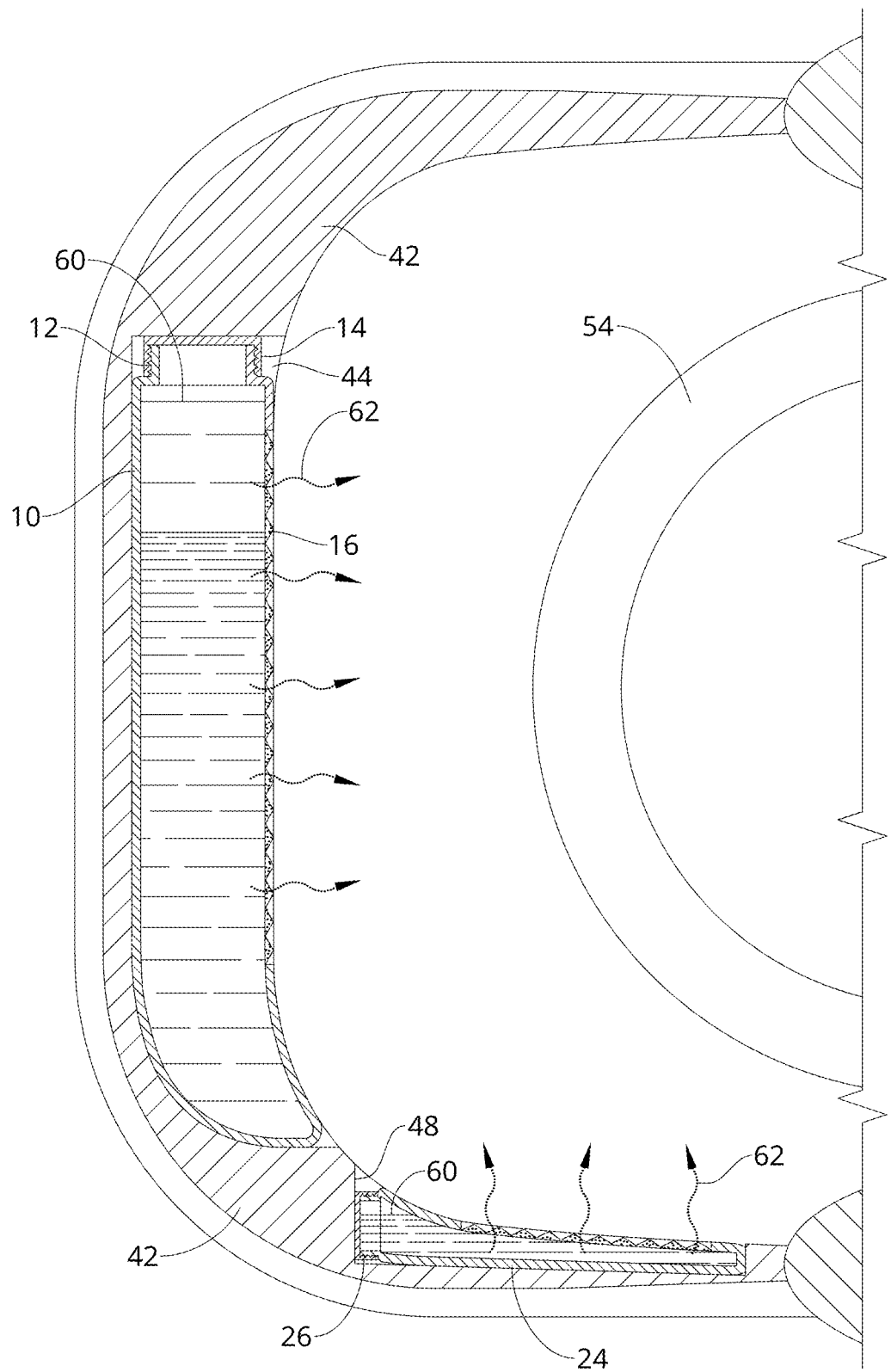
FIG. 5 is a section view taken along line 5-5 in FIG. 5.
Figure 6:
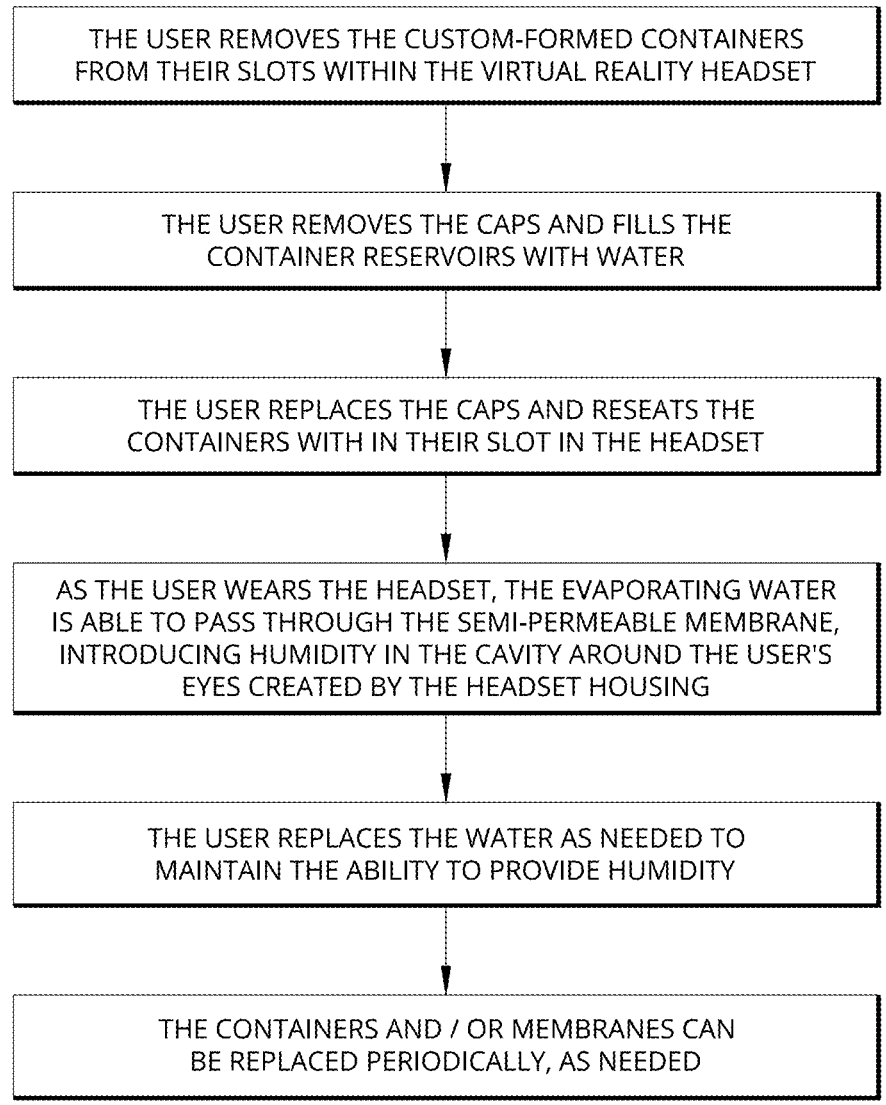
FIG. 6 is a flow chart listing steps for using the VR headset system, according to certain embodiments.

To address these issues, the disclosed subject matter introduces a virtual reality system which increases environmental humidity of the microclimate around the eyes of a user. In certain embodiments as depicted in FIGS. 1-6 the disclosed system provides at least one humidification element which may be incorporated (i.e., coupled) into a VR headset 40. In certain embodiments, VR headset 40 may generally comprise a housing 42 supporting eyepieces 54 and a mounted screen 56, with a head attachment element 58 such as a band coupled to housing 42. In some further embodiments, VR headset 40 may comprise a ventilation fan 64, and/or other ventilation elements, but not necessarily so.

In certain embodiments, humidification element may generally comprise a reservoir for holding water 69 with at least one evaporative surface which allows for diffusion of the water from within the reservoir for increasing humidity in the VR environment. In one embodiment, the evaporative surface may comprise a pleated semi-permeable membrane which can be made of biological or synthetic materials such as cellulose or polyamide, but is not limited to these options. The reservoir may further include a removable seal element, such as a cap which may be threaded to a spout, of the reservoir for allowing a user to fill the container with water. Further, the reservoir may have magnetic surface on one of the sides that can be coupled with a magnetic counter surface in the VR headset body to ensure a good fit. Other embodiments might use mechanical coupling using Velcro-like material or adhesives.

In some embodiments, VR headset 40 may include at least one slot configured to retain the humidification element. In certain embodiments, the slot(s) may be provided on an interior side of headset housing 42 for introducing evaporation humidity 62 into the interior cavity 52 of the housing and directly around the eye area of the wearer. In further embodiments, multiple slots may be provided within headset 40 for retaining a corresponding number of humidification elements. In still other embodiments, the water reservoir may be outside and separate from the VR headset and connected to the evaporative elements in headset by tubes.

According to an exemplary embodiment as depicted in the figures, an inner side of headset housing 42 may include a left side housing slot 44 configured to hold a left side reservoir 10 of a left side humidification element, and a right side housing slot 46 configured to hold a right side reservoir 18 of a right side humidification element. Left side reservoir 10 includes a left side pleated membrane 16 which faces towards inner cavity 52 and is substantially flush with respect to the inner wall of housing 42 when reservoir 10 is held within slot 44. Left side reservoir 10 further includes a spout 12 cap 14, as shown. Right side reservoir 18 includes a right side pleated membrane 22 which faces towards inner cavity 52 and is substantially flush with respect to the inner wall of housing 42 when reservoir 18 is held within slot 46. Right side reservoir 18 further includes spout and cap components 20. In some embodiments, left side reservoir 10, left side plated membrane 16 and left side housing slot 44 may be in mirroring relationship to right side reservoir 18, right side pleated membrane 22, and right side housing slot 46. In some further embodiments, a left bottom housing slot 48 and right bottom housing slot 50 may also be provided within an inner side of headset housing 42 and are configured to retain a left bottom reservoir 24 and a right bottom reservoir 30, respectively. Left bottom reservoir 24 includes a left bottom pleated membrane 28 and spout and cap elements 26. Right bottom reservoir 30 includes a right bottom pleated membrane 34 and spout and cap elements 32. Bottom pleated membranes, 28 and 34, are both configured to face upwards towards inner cavity and are substantially flush with respect to the inner wall of housing 42 when reservoirs 24 and 30 are held within their respective slots. As such, reservoirs 16, 18, 24, and 30 can be equally or unequally spaced around eyepieces 54 on the left and right sides and are shaped to conform to the shape of the slots and inner walls of the VR frame.

As depicted in the figures, the slots for receiving the reservoirs provide depressions within housing 42 that matches the shape of the reservoirs. In certain embodiments, each reservoir may snap into its respective slot. In some embodiments, the reservoirs may snap lock into their respective slots and are held in place via friction. In alternate embodiments, the reservoirs may be permanently coupled to the headset. Thus, the reservoirs unobtrusively integrate with headset housing 42 and include an evaporative surface which is flush with the side wall of the housing. In certain embodiments the evaporative surface might protrude inside the VR interior environment but do so without causing any obstruction to the user's view. The reservoirs may be filled with water or any other hydration fluids and inserted into the slots within the headset to increase humidity within the headset 40. In one embodiment, the disclosed system may provide a humidity level of between about 30-50%. However, the multiple reservoirs also allow the user to control the humidity level by using and/or filling less than all of the reservoirs if desired. Furthermore, some embodiments can employ a humidity sensor that can track the humidity of VR microclimate and increase the rate of ventilation whenever the humidity increases too high. Once the water within each reservoir is depleted, the reservoir may be removed from its slot and refilled, wherein the cap may be removed and reinstalled.

Thus, the disclosed subject matter provides a system which increases the level of humidity in a VR headset for microclimate control. This provides greater comfort/wearability and reduces adverse effects such as fatigue, xerophthalmia, refractive errors, etc., due to drying of eye globe caused by use of VR headsets. As such, the user may comfortably increase use time of the headset. It shall be appreciated that VR headset 40 may have different design features and components in alternate embodiments, and may be configured to hold any number of reservoirs. Additionally, the reservoirs may have various shapes, and different types of evaporative surface(s) of various sizes/dimensions in alternate embodiments. In some embodiments, VR headset 40 may comprise other components shown in the art for increasing eye comfort.

It shall be appreciated that the disclosed device and system can have multiple configurations in different embodiments. Furthermore, the disclosed system may be adapted for use with any other type of eyewear (e.g., conventional glasses, snow/ski goggles, motorcycle goggles), helmets, etc., to alleviate eye dryness and/or in low humidity environments. In some alternate embodiments, the reservoir may be provided outside of the headset housing and/or other elements for increasing humidity in the VR environment may also be used.

It shall be appreciated that the device and system described herein may comprise any alternative known materials in the field and be of any color, size, and/or dimensions. In one embodiment, the reservoirs may be made of low cost materials such as a semi-permeable membrane, plastic etc. and can be easily replaced and/or reused (e.g., after 1-2 week of use). It shall be appreciated that different materials may be used in alternate embodiments. It shall be appreciated that the device may be manufactured and assembled using any known techniques in the field.

The terms VR interior environment, VR interior cavity and VR microclimate all refer to the space that is inside the VR headset to which the user's eyes are directly exposed to.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A virtual reality method, comprising:
    increasing humidity around the eye area of an individual using a virtual reality headset via at least one humidification element incorporated into the headset,
    wherein the humidification element comprises at least one water retaining reservoir which includes at least one evaporative surface,
    wherein the water retaining reservoir is removable and replaceable from a slot within a housing of the virtual reality headset, and
    wherein the humidification element allows for diffusion of water from within the water retaining reservoir through the evaporative surface for maintaining humidity in the headset.

2. The method of claim 1, wherein the evaporative surface comprises a semi-permeable pleated membrane.

3. The method of claim 1, wherein the evaporative surface comprises a synthetic membrane polyamide material.

4. The method of claim 1, wherein the slot is provided on an interior side of the housing and is configured to introduce humidity into an interior cavity of the headset.

5. The method of claim 4, wherein the evaporative surface of the water retaining reservoir faces towards the interior cavity of the virtual reality headset.

6. The method of claim 5, wherein the housing includes multiple slots, each configured to receive the water retaining reservoir including said evaporative surface.

7. The method of claim 6, wherein an interior of the housing includes a left side housing slot configured to hold a left side water retaining reservoir, and a right side housing slot configured to hold a right side water retaining reservoir.

8. The method of claim 7, wherein the interior of the housing further includes a left bottom housing slot configured to retain a left bottom water retaining reservoir and a right bottom housing slot configured to retain a right bottom water retaining reservoir.

9. The method of claim 1, wherein the water retaining reservoir is magnetically and/or mechanically attachable to said slot.

10. The method of claim 1, wherein the evaporative surface of the water retaining reservoir is flush with a side wall of the housing when the water retaining reservoir is inserted into said slot.

\* \* \* \* \*